United States Patent
Yang et al.

(10) Patent No.: US 9,626,043 B2
(45) Date of Patent: Apr. 18, 2017

(54) OPTICAL TOUCH SYSTEM AND METHOD FOR OPTICAL TOUCH LOCATION

(75) Inventors: Jingping Yang, Beijing (CN); Ke Shang, Beijing (CN); James Rutledge, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 705 days.

(21) Appl. No.: 13/260,648

(22) PCT Filed: Mar. 24, 2010

(86) PCT No.: PCT/CN2010/071271
§ 371 (c)(1),
(2), (4) Date: Sep. 27, 2011

(87) PCT Pub. No.: WO2010/108436
PCT Pub. Date: Sep. 30, 2010

(65) Prior Publication Data
US 2012/0075191 A1    Mar. 29, 2012

(30) Foreign Application Priority Data
Mar. 27, 2009  (CN) .......................... 2009 1 0080893

(51) Int. Cl.
*G06F 3/042*  (2006.01)
(52) U.S. Cl.
CPC .................. *G06F 3/0428* (2013.01)
(58) Field of Classification Search
CPC .................. G06F 3/0428; G02F 2001/133616
(Continued)

(56) References Cited

U.S. PATENT DOCUMENTS

| 7,202,860 B2 | 4/2007 | Ogawa |
| 2003/0085871 A1 | 5/2003 | Ogawa |
| (Continued) | | |

FOREIGN PATENT DOCUMENTS

| CN | 1588433 A | 3/2005 |
| CN | 1635541 A | 7/2005 |
| (Continued) | | |

OTHER PUBLICATIONS

PCT/CN2010/071271 International Search Report dated May 10, 2010 (7 pages).
(Continued)

*Primary Examiner* — Ryan A Lubit
(74) *Attorney, Agent, or Firm* — Brinks Gilson & Lione; G. Peter Nichols

(57) ABSTRACT

The present invention provides an optical touch system, applied to an electronic apparatus having at least a physical plane. It comprises: an optical unit set on the physical plane and configured to produce a first optical effect; an image acquisition unit set on the physical plane, at least a part of the optical unit being within an acquisition range of the image acquisition unit, a touch operation area being formed by the image acquisition unit and the optical unit; the image acquisition unit configured to capture an image having a second optical effect which is formed on the first optical effect after an operation body for operating the electronic apparatus enters the touch operation area; a processing unit being connected with the image acquisition unit and configured to determine the range of the operation body in the touch operation area according to the image having the second optical effect. The present invention also provides an optical touch input display apparatus and optical touch input positioning method. The touch system of the present invention is low-cost and highly reliable.

22 Claims, 14 Drawing Sheets

(58) Field of Classification Search
USPC .................. 345/168–178; 178/18.01–20.04
See application file for complete search history.

(56) References Cited

U.S. PATENT DOCUMENTS

| | | | |
|---|---|---|---|
| 2006/0024017 A1* | 2/2006 | Page et al. .................... 385/146 |
| 2006/0114244 A1* | 6/2006 | Saxena ................. G06F 3/0421 |
| | | | 345/175 |
| 2006/0120104 A1* | 6/2006 | Iwasa ....................... F21S 4/26 |
| | | | 362/576 |
| 2007/0121345 A1* | 5/2007 | Chang et al. ................. 362/633 |
| 2008/0029691 A1* | 2/2008 | Han .............................. 250/224 |
| 2008/0259053 A1* | 10/2008 | Newton ................ G06F 3/0421 |
| | | | 345/175 |
| 2009/0067190 A1* | 3/2009 | Funabashi et al. ........... 362/558 |
| 2010/0079409 A1* | 4/2010 | Sirotich ................ G06F 3/0425 |
| | | | 345/175 |
| 2010/0163317 A1* | 7/2010 | Tai .............................. 178/18.09 |
| 2010/0288614 A1* | 11/2010 | Ender ................. G02B 6/0065 |
| | | | 200/5 A |
| 2010/0295821 A1* | 11/2010 | Chang et al. ................. 345/175 |

FOREIGN PATENT DOCUMENTS

| | | | |
|---|---|---|---|
| CN | 101145091 A | | 3/2008 |
| CN | 101216632 | * | 7/2008 |
| CN | 101216632 A | * | 7/2008 |
| CN | 101216632 A | | 7/2008 |
| CN | 101231450 A | | 7/2008 |
| CN | 101271372 | * | 9/2008 |
| CN | 101271372 A | * | 9/2008 |
| CN | 101271372 A | | 9/2008 |
| KR | 10-2007-0119375 | | 12/2007 |

OTHER PUBLICATIONS

PCT/CN2010/071271 International Preliminary Report on Patentability (12 pages) dated Sep. 27, 2011.
Chinese First Office Action with English Translation for related Application No. 2009100808934 dated May 18, 2011, 26 pages.
Chinese Second Office Action with English Translation for related Application No. 2009100808934 dated Sep. 28, 2011, 22 pages.
Chinese Third Office Action with English Translation for related Application No. 2009100808934 dated Feb. 16, 2012, 10 pages.

* cited by examiner

OPTICAL TOUCH SYSTEM AND METHOD FOR OPTICAL TOUCH LOCATION

BACKGROUND

The present invention relates to an optical touch system and optical touch positioning method.

At present, the commonly-used touch technologies include two technologies of capacitive touch and optical touch.

In the technology of the capacitive touch, a transparent conductive material needs to be attached onto a screen which makes the cost higher. Moreover, since the capacitance varies with the temperature, humidity, or ground condition, it is less stable and a drift phenomenon occurs frequently.

Whereas in the technology of the optical touch, a camera is required to be arranged above the screen, and the positioning of a finger is completed by acquiring images of finger movements, and performing complex analysis on the images of finger movements. The cost of this implementation depends on the precision of the camera and the ability of operation processing. Moreover, in order to be capable of capturing the whole touch area, the position of the camera is usually required to be away from apparatus which comprises the touch area. Therefore, the whole apparatus is relatively complex and not convenient for users to use, and the cost is high because of the complexity of the components.

During the implementation of the present invention, the inventor finds that there still are some defects such as a complex structure, inconvenience for users to use, high cost, and poor anti-interference in the current optical touch system.

Thus, there is a need for an improved optical touch system.

SUMMARY

In light of the problem mentioned above, an objective of the present invention is to provide an optical touch system, which is low-cost and has reliable performance and long operating lifetime, and which is able to locate a touch range of a touch object effectively.

In accordance with one aspect of the present invention, there is provided an optical touch system, which is applied to an electronic apparatus having at least a physical plane, and which comprises: an optical unit set on the physical plane and configured to produce a first optical effect; an image acquisition unit set on the physical plane, at least a part of the optical unit being within an acquisition range of the image acquisition unit, a touch operation area being formed by the image acquisition unit and the optical unit; the image acquisition unit being used to capture an image having a second optical effect which is formed on the first optical effect after an operation body for operating the electronic apparatus enters the touch operation area; a processing unit being connected with the image acquisition unit and configured to determine the range of the operation body in the touch operation area according to the image having the second optical effect.

Wherein, the optical unit comprises: a light source; and a first optical component configured to have an end face facing the light source to receive light from the light source and deliver the light from the light source onto the physical plane.

Preferably, a protective layer for protecting the light source is included on top of the light source.

Preferably, light-reflecting particles are set in the first optical component.

Preferably, the first optical component is a light guide plate, an optical fiber or a light-reflecting strip.

Preferably, the light source is a point light source set on the physical plane; and the first optical component is a light guide plate set on the physical plane, the light guide plate having an end face facing the point light source and configured to scatter light from the point light source onto the physical plane.

Preferably, the light guide plate comprises: a reflective film located on one side of a main body portion of the light guide plate and configured to reflect the light propagated within the light guide plate; a scattering film located on the other side of the main body portion of the light guide plate and configured to scatter the light reflected by the reflective film onto the physical plane.

Preferably, the light guide plate further comprises: an anti-reflection film located between the scattering film and the main body portion of the light guide plate and configured to increase the amount of light which is propagated within the light guide plate and passes through the scattering film.

Preferably, the light guide plate contains: a main body portion of the light guide plate doped with reflective particles for reflecting light therein; a reflective film located on one side of the main body portion of the light guide plate and configured to reflect the light from the main body portion of the light guide plate; and a scattering film located on the other side of the main body portion of the light guide plate and configured to scatter the light reflected by the reflective film onto the physical plane.

Preferably, the light source is a point light source set on the physical plane; and the first optical component is an optical fiber set on the physical plane, the optical fiber having an end face facing the point light source and configured to receive light from the point light source and scatter the light from the point light source onto the physical plane through a side face of the optical fiber.

Preferably, the optical fiber comprises: a core portion doped with reflective particles for reflecting light therein; and a peripheral portion surrounding the core portion, the refractive index thereof is less than that of the core portion.

Preferably, the optical unit comprises: a light source; a first optical component configured to have an end face facing the light source to receive light from the light source; and a second optical component configured to have a side face facing a side face of the first optical component to receive the light from the first optical component and deliver the light from the first optical component onto the physical plane.

Preferably, light-reflecting particles are set in the second optical component.

Preferably, the first optical component is an optical fiber, and the second optical component is a light guide plate or a light-reflecting strip.

Preferably, the light source is a point light source set on the edge of the physical plane; the optical fiber is set along the edge of the physical plane, the optical fiber having an end face facing the point light source and configured to receive light from the point light source and scatter the light from the point light source through a side face of the optical fiber; and the light guide plate is set on the optical fiber along the edge of the physical plane, the light guide plate is configured to scatter the light from the optical fiber onto the physical plane.

Preferably, the optical unit comprises: a plurality of point light sources arranged in a straight line at a predetermined interval, set on the edge of the physical plane, and configured to irradiate the physical plane; wherein, the predetermined interval is smaller than the width of the operation body.

Preferably, the point light sources are at least one of light-emitting diodes and laser diodes.

Preferably, the image acquisition unit is set at one vertex or two vertexes located on a first edge on the physical plane respectively.

Preferably, the light source is a point light source, and the point light source is set at one vertex or two vertexes located on a second edge facing the first edge on the physical plane respectively.

Preferably, the first optical component and/or the second optical component are set on other edges other than the first edge on the physical plane respectively.

In accordance with another aspect of the present invention, there is provided another optical touch system, which comprises: an optical unit set on a first fixed-point in the space and configured to produce a first optical effect; an image acquisition unit set on a second fixed-point in the space, at least a part of the optical unit being within an acquisition range of the image acquisition unit, a touch operation area being formed by the image acquisition unit and the optical unit, the image acquisition unit configured to capture an image having a second optical effect which is formed on the first optical effect after an operation body for operating the electronic apparatus enters the touch operation area; a processing unit connecting with the image acquisition unit and configured to determine the range of the operation body in the touch operation area according to the image having the second optical effect.

Wherein, the optical unit comprises: a light source; a first optical component configured to have an end face facing the light source to receive light from the light source and scatter the light from the point light source to the touch operation area.

Preferably, light-reflecting particles are set in the first optical component.

Preferably, the first optical component is a light guide plate, an optical fiber or a light-reflecting strip.

In accordance with another aspect of the present invention, there is provided an optical touch input display apparatus, which comprises: a display unit used to display information; a first optical unit, a second optical unit, and a third optical unit set on the left frame, the right frame, and the lower frame on the display side of the display unit respectively and configured to produce a first optical effect; a first image acquisition unit set on the upper left part of the display side of the display unit; a second image acquisition unit set on the upper right part of the display side of the display unit; wherein, a touch operation area is formed by the first optical unit, the second optical unit, the third optical unit, the first image acquisition unit, and the second image acquisition unit; the first image acquisition unit is used to acquire a first image which is an image formed on the first optical effect produced by the second optical unit and/or the third optical unit after an operation body enters the touch operation area; the second image acquisition unit is used to acquire a second image which is an image formed on the first optical effect produced by the first optical unit and/or the third optical unit after the operation body enters the touch operation area; a processing unit connected with the first image acquisition unit and the second image acquisition unit and configured to determine the range of the operation body in the touch operation area according to the first image and the second image.

Wherein, the first optical unit, the second optical unit, and the third optical unit comprise: a light source; and a first optical component set to face the light source to receive light from the light source and deliver the light from the point light source to the touch operation area.

In accordance with another aspect of the present invention, there is provided an optical touch input apparatus, which comprises: a keyboard; a first optical unit, a second optical unit, and a third optical unit set on the left side, the right side, and the lower side of the keyboard respectively and configured to produce a first optical effect; a first image acquisition unit set on the upper left part of the keyboard; a second image acquisition unit set on the upper right part of the keyboard; wherein, a touch operation area is formed by the first optical unit, the second optical unit, the third optical unit, the first image acquisition unit, and the second image acquisition unit; the first image acquisition unit is configured to acquire a first image which is an image formed on the first optical effect produced by the second optical unit and/or the third optical unit after an operation body enters the touch operation area; the second image acquisition unit is used to acquire a second image which is an image formed on the first optical effect produced by the first optical unit and/or the third optical unit after the operation body enters the touch operation area; a processing unit connected with the first image acquisition unit and the second image acquisition unit and configured to determine the range of the operation body in the touch operation area according to the first image and the second image.

Wherein, the first optical unit, the second optical unit, and the third optical unit comprise: a light source and a first optical component and a second optical component.

Wherein, the first optical component is configured to have an end face facing the light source to receive light from the light source; and the second optical component is configured to have a side face facing a side face of the first optical component to receive the light from the first optical component and deliver the light from the first optical component to the touch operation area.

In accordance with another aspect of the present invention, there is provided an optical touch input apparatus, which comprises: a keyboard having a plurality of keys; a first optical unit, a second optical unit, and a third optical unit set on at least one key respectively and configured to produce a first optical effect; wherein, the first optical unit, the second optical unit, and the third optical unit are able to constitute a continuous semi-enclosed area; first image acquisition unit is set on the left side of the non-enclosed direction of the semi-enclosed area; a second image acquisition unit is set on the right side of the non-enclosed direction of the semi-enclosed area; wherein, a touch operation area is formed by the first optical unit, the second optical unit, the third optical unit, the first image acquisition unit, and the second image acquisition unit; the first image acquisition unit is configured to acquire a first image which is an image formed on the first optical effect produced by the second optical unit and/or the third optical unit after an operation body enters the touch operation area; the second image acquisition unit is configured to acquire a second image which is an image formed on the first optical effect produced by the first optical unit and/or the third optical unit after the operation body enters the touch operation area.

Wherein, the keyboard is a keyboard of a laptop; the first image acquisition unit is set on the left side of a junction between a host and a screen of the laptop, and the second image acquisition unit is set on the right side of the junction.

Preferably, the first optical unit, the second optical unit, and the third optical unit are optical fibers which consist of one or multiple discontinuous optical fibers.

Preferably, in the case that the optical fibers consist of multiple discontinuous optical fibers, the multiple discontinuous optical fibers are set on keys in a predetermined area of the keyboard.

Preferably, the optical fiber of the first optical unit is set on the left side of the key located at the left edge; the optical fiber of the second optical unit is set on the right side of the key located at the right edge; and the optical fiber of the third optical unit is set on the lower side of the key located at the lower edge or the upper side of the space key on the keyboard.

In accordance with another aspect of the present invention, there is provided an optical touch positioning method for an optical touch system which includes an optical unit configured to produce a first optical effect; and an image acquisition unit, at least a part of the optical unit being within an acquisition range of the image acquisition unit, a touch operation area formed by the image acquisition unit and the optical unit; the method comprises the step of: capturing an image having a second optical effect which is formed on the first optical effect after an operation body for operating the electronic apparatus enters the touch operation area; and determining the range of the operation body in the touch operation area according to the image having the second optical effect.

Wherein, the first optical effect is the effect that the optical unit emits light, from the view of the acquisition unit; and the second optical effect is the effect which is formed in the optical acquisition unit after the operation body enters the touch operation area and blocks the light, from the view of the acquisition unit.

Wherein, a touch range of the operation body in the touch area is obtained by analyzing an included angle between the image acquisition unit and the image according to the image.

Wherein, two included angles between the touch position and two acquisition units are obtained with the two image acquisition units respectively, so as to form a triangle, and then, the accurate position of the touch position in the touch area is obtained by means of a triangular positioning technique according to a preset distance between the image acquisition units.

The following technical effects are achieved by the technical solutions of the present invention:

The influence of ambient illumination can be avoided by employing the optical touch system according to the embodiment of the present invention. It is still possible that the frame may be illuminated when there is a large amount of infrared light. The recognition of the touch position is impacted because the design of the light-absorbing frame in the prior art will cause substantive interference. The frame will not be impacted by the ambient infrared light by employing the design of one optical component according to the embodiment of the present invention, so that the ambient interference can be reduced, the accuracy of the touch operation can be improved, the structure is simple and the cost is low.

Furthermore, in case of using the design of one optical component, since the light source is facing the optical component and the protective layer on top of the light source is necessary, the height by which the whole optical unit is higher than the display screen is the thickness of the light source plus thickness of a protective layer. Whereas in the case of the design with two optical components, since the first optical component and the light source are set in the position with the same height as the display screen and the second optical component which can use a solid material such as organic glass or the like and which can thus act as the protective layer is set on top of the first optical component and the light source, the height by which the whole optical unit is higher than the display screen is only the thickness of the second optical component, therefore the frame thickness around the display screen is significantly reduced, which is suitable for products (e.g., a keyboard) with operating requirement or products (e.g., a laptop screen) with requirement on lightness and thinness.

It should be noted that both the above explanation and following detailed explanation are illustrative, with the intention of providing further explanation of the claimed present invention.

In addition to the above-mentioned objectives, features and advantages, the present invention has other objectives, features and advantages, which will be further explained in detail below with reference to the drawings.

BRIEF DESCRIPTION OF THE DRAWINGS

The drawings explained herein are used to provide a further understanding of the present invention and constitute a part of the present application. The Exemplary embodiments of the present invention and explanation thereof are used to explain the present invention, and do not constitute an improper definition of it. In the drawings.

DETAILED DESCRIPTION

The present invention is further explained below in connection with the drawings and the detailed description.

Figure 1:
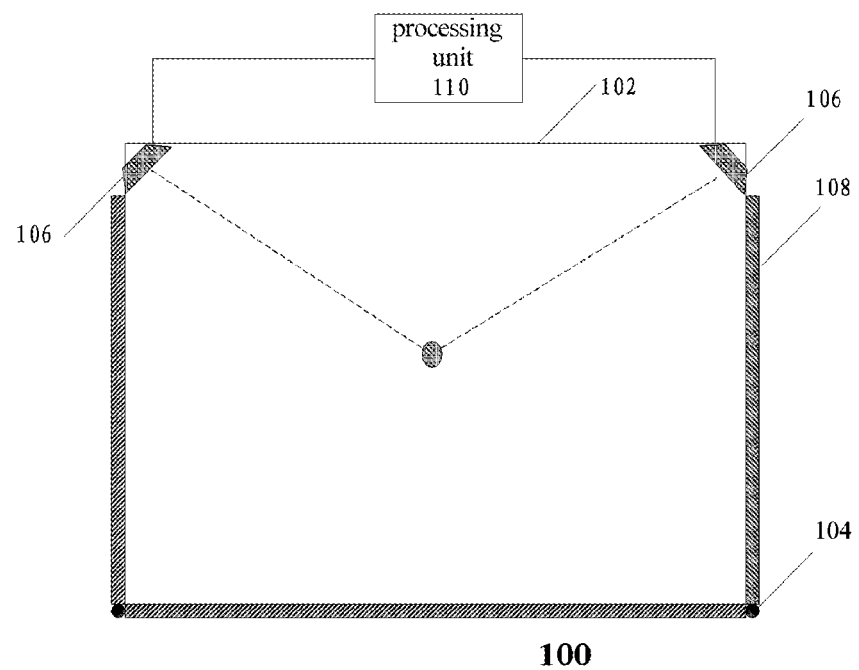
FIG. 1 is an illustrative diagram of an optical touch system according to one embodiment of the present invention.

FIG. 1 is an illustrative diagram of an optical touch system according to one embodiment of the present invention.

As shown in FIG. 1, in this embodiment, the optical touch system 100 is applied to a display and is set on the edge of a display screen 102. It comprises point light sources 104, light guide plates 108, protective layers (not shown in the figure), cameras 106, and a processing unit 110. The point light sources 104 are set at two vertexes on the lower side of the display screen. The light guide plates 108 are set on the edges of the left side, right side and lower side of a display side of the display screen, and have end faces at the vertexes on the lower side of the display screen facing the point light sources, so that light emitted by the point light sources enters into the light guide plates and is scattered toward the display screen through the light guide plates. The upper sides of the light guide plates are higher than the display screen and the lower sides thereof are flush with or slightly below the display screen to ensure that the light is adequately irradiated onto the plane of the display side of the display screen. The protective layers are on top of the light sources so as to protect the light sources. Since the light sources and the light guide plates are facing each other, the whole protective layers need to be located on top of the light sources and the light guide plates, in order to obtain a design of aesthetics and integral frame. The cameras 106 are set at two vertexes on the upper side of the display screen and face the directions in which the light guide plates exist. A touch operation area is formed between the cameras 106 and the light guide plates 108. The cameras 106 are used to acquire images on the touch operation area, the images are formed because a touch operation body blocks the light scattered by the light guide plates. The processing unit 110 is connected with the cameras 106 and is configured to determine the position of the operation body according to the images acquired by the cameras 106. Wherein, the point light sources 104 may be LEDs, laser diodes having various wavelengths, or the like. And wherein, the cameras 106 may be various kinds of image acquisition devices, such as optical sensors, still cameras, infrared cameras, or the like.

The operating principle of this system is as follows: the point light sources 104 set at the vertexes on the lower side of the display screen irradiate the end faces of the light guide plates 108 facing the point light sources 104; the light enters into the light guide plates; the light guide plates deliver the light and emit light as a whole, in order to form linear light sources; a part of the light is irradiated onto the surface of the display screen and into the cameras through the scattering by the light guide plates; the light scattered by the light guide plates will be acquired by the cameras; and the image that each light guide plate forms in the camera is a bright bar. When a finger or other object is moved in the area formed by the camera and the light guide plate producing the light (with the display screen being or not being touched), A part of the light emitted by the linear light source is blocked and cannot be acquired by the camera, so that a shadow appears in the image of the linear light source formed in the camera. The processor connected with the camera determines the position or range of the finger or other touch operation body in the touch area by analyzing an included angle between the camera and the shadow image according to the shadow, so as to judge which operation is to be performed. The specific recognition method will be described in detail hereinafter.

Preferably, because the infrared light is invisible to the human eye, the visual impact for the user is little. Therefore, an infrared light source may be employed as the light source mentioned above. Accordingly, an infrared camera is used as the image acquisition equipment. Of course, other light sources and corresponding image acquisition equipments may also be employed.

Apparently, the above-mentioned embodiment is only a preferred implementation; however, the present invention is not limited to this and may have a variety of implementations. For example, the light source may be set in the light guide plate instead of the vertexes of the touch screen; independent light sources may be used for each light guide plate and the same light source may be used for two adjacent light guide plates; and in addition, the camera may be set at the non-vertex on the edge of the display screen where the light guide plate is not set, as long as it is able to acquire at least a part of the light scattered by the light guide plate. Additionally, the light guide plate may also be various light guide devices of other shapes, such as a cylindrical, a rectangular, a prism, or the like.

The above embodiment is described by applying of the optical touch system to a display as an example; however, it is clear that the optical touch system can be applied to not only the display but also many other places, for example, a television, a computer keyboard, a mobile apparatus, an apparatus such as a laptop, an integrated machine display screen or the like. In other words, it can be applied to any electronic apparatus having a physical plane.

Generally speaking, a touch operation area is formed by the camera and the optical element in the touch system; an optical effect (scattering the light and irradiating the surface of the display screen) are generated by the optical element; another optical effect (the operation body blocking the light and forming an image having the shadow in the camera) is generated by the interaction between the operation body and the former optical effect; the image acquisition equipment acquires the another optical effect and delivers the acquired image to the processor; and the touch position or range of the operation body on the touch plane is obtained by the processor through processes, so that the operation to be performed by the operator is judged.

Figure 2A:
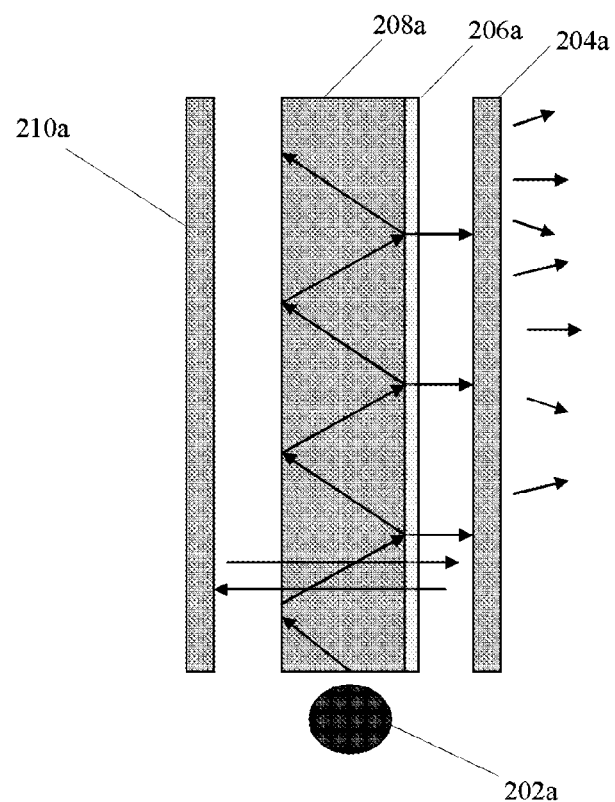
FIG. 2a is an illustrative diagram of a light guide plate structure according to one embodiment of the present invention.

FIG. 2a is an illustrative diagram of a light guide plate structure according to one embodiment of the present invention.

As shown in FIG. 2a, the light guide plate includes an intermediate main body portion 208a, a reflective film 210a, and a scattering film 204a. The reflective film 210a is located on one side of the main body portion and is configured to reflect light. The scattering film 204a is located on the other side of the light guide plate and is configured to scatter the light reflected by the reflective film to the surface of the touch screen to make the light more uniform, which is advantageous for improving the quality of the image formed when the touch operation body is moved into the touch area and acquired by the camera, and it is advantageous for the recognition process for the image executed by the processing unit. Moreover, an anti-reflection film 206 may also be set between the scattering film and the light guide plate, the anti-reflection film 206 makes more of the light pass through the scattering film and scatter onto the touch screen so as to improve the utilization rate of the light. As shown in FIG. 2a, the light emitted from the light source 202a enters into the light guide plate and is reflected in the light guide plate, so that a part of the light is irradiated onto the reflective film 210a, reflected back into the main body portion 208a and transmitted onto the scattering film through the anti-reflection film 206, while the other part of the light is directly reflected onto the scattering film and then scattered onto the touch screen by the scattering film.

The gap in the figure is just to explain the structure of the light guide plate more clearly, while, in fact, the gap as shown in the figure does not exist between the main body of the light guide plate and the reflective film or the scattering film.

Figure 2B:
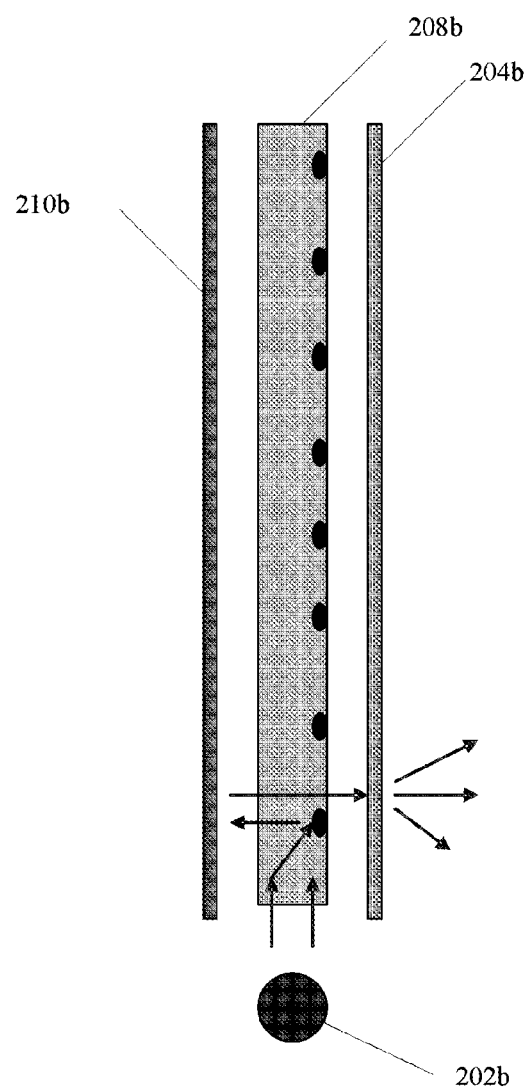
FIG. 2b is an illustrative diagram of another light guide plate structure according to one embodiment of the present invention.

FIG. 2b is an illustrative diagram of another light guide plate structure according to one embodiment of the present invention.

As shown in FIG. 2b, the light guide plate includes an intermediate main body portion 208b, a reflective film 210b, and a scattering film 204b. The light guide plate is made of the organic glass. Reflective particles (which may be for example ink dots of printing ink) having high light-reflecting property and as shown by the black part in the figure, are set close to the surface on one side of the organic glass for reflecting light. The reflective film 210b is set outside the main body portion 208b and is configured to reflect the light from the light guide plate. The scattering film 204b is set inside the main body portion 208b and is configured to scatter the light from the main body of the light guide plate to the surface of the display screen to make the light more uniform, which is advantageous for improving the quality of the image formed when the touch operation body is moved into the touch area and acquired by the camera, and it is advantageous for the recognition process for the image executed by the processing unit.

The operating principle thereof is as follows: the light emitted from the light source 202b enters into the light guide plate, and the light satisfying a total reflection condition moves along the path of total reflection. After the light irradiates to the ink dots of printing ink, there will be a reflection which breaks the condition of total reflection, so that the light may be emitted out of the main body portion of the light guide plate and irradiated onto the reflective film. The light enters into the scattering film and is scattered to the outside thought the reflection of the reflective film. The light is scattered onto the display screen in this embodiment.

Figure 3:
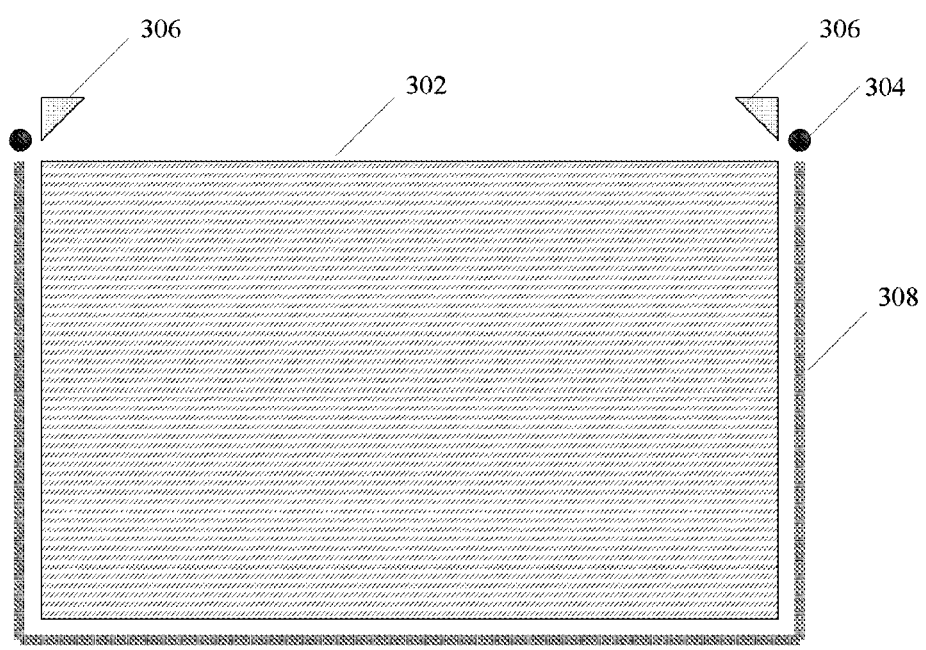
FIG. 3 is an illustrative diagram of an optical touch system according to another embodiment of the present invention.

FIG. 3 is an illustrative diagram of an optical touch system according to another embodiment of the present invention.

The optical touch system as shown in FIG. 3 is different from the optical touch system in the embodiment of FIG. 1 in that the light guide plates are replaced with optical fibers 308; light sources 304 are set at two vertexes on top of a display screen 302 (apparently, the light sources can also be set at other vertexes), acquisition units such as cameras 306 are also set at the two vertexes on upper side of the display screen (apparently, the light sources can also be set at other positions); and a side-light-emitting type of optical fiber is employed in this embodiment.

The operating principle thereof is as follows: the light emitted by the point light sources enters into the end faces of the optical fibers and propagates in the optical fibers, and a part of the light is scattered onto the display screen and into the cameras through the side faces of the optical fibers. Wherein, along the direction of the thickness of the screen, at least a part of the optical fibers are located on the screen so as to be able to irradiate any position of the screen. A touch operation area where the operator can perform a touch operation is formed between the optical fibers and the cameras. A touch operation (for example touching the area with a finger) blocks a part of the light emitted by the optical fibers, so that a shadow appears in an image formed in the camera by the optical fiber. The image is delivered to a processor (not shown in the figure) connected with the cameras. The processor determines the position or range of the finger or other touch operation body in the display screen by analyzing an included angle between the camera and the shadow image according to the shadow, so as to judge which operation is to be performed.

The difference between employing the optical fiber as the light guide means and employing the light guide plate in the above-mentioned embodiment 1 as the light guide means is that it is not necessary to set the reflective film and the scattering film, and therefore, the structure is simpler. The specific structure of the optical fiber will be described in detail hereinafter.

Figure 4:
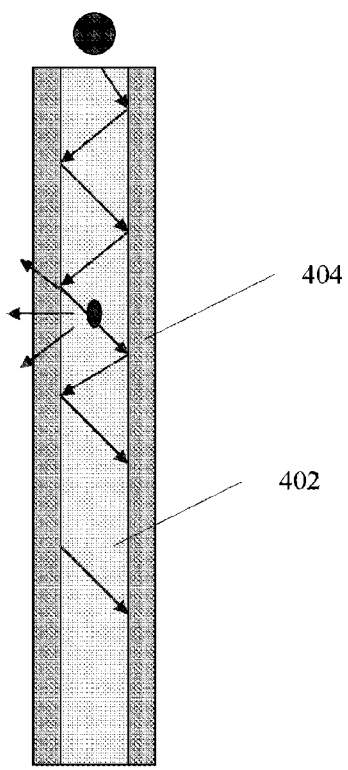
FIG. 4 is an illustrative diagram of an optical fiber structure according to one embodiment of the present invention.

FIG. 4 is an illustrative diagram of an optical fiber structure according to one embodiment of the present invention.

As shown in FIG. 4, a side-light-emitting type of optical fiber which consists of both an inner portion and an outer portion (i.e., a core portion 402 and a peripheral portion 404) is shown in the figure. The operating principle thereof is as follows: a light enters into the optical fiber 400 through its end face; when it is injected onto the interface between the core portion 402 and the peripheral portion 404, because the material of the inner portion is different from that of the outer portion (the refractive index of the outer portion is less than that of the inner portion), the light will be refracted; the light in a certain range of angles will propagate in the optical fiber in the way of total reflection; a number of light-reflecting particles, preferably highly light-reflecting particles, are mixed into the inner portion of the side-light-emitting optical fiber during production, the main purpose for mixing light-reflecting particles is for scattering the light; the light will be scattered in a plurality of directions when being irradiated onto the highly light-reflecting particles, thus the total reflection condition is broken, and the light is emitted from the side face of the optical fiber and is scattered onto the display screen.

Figure 5A:
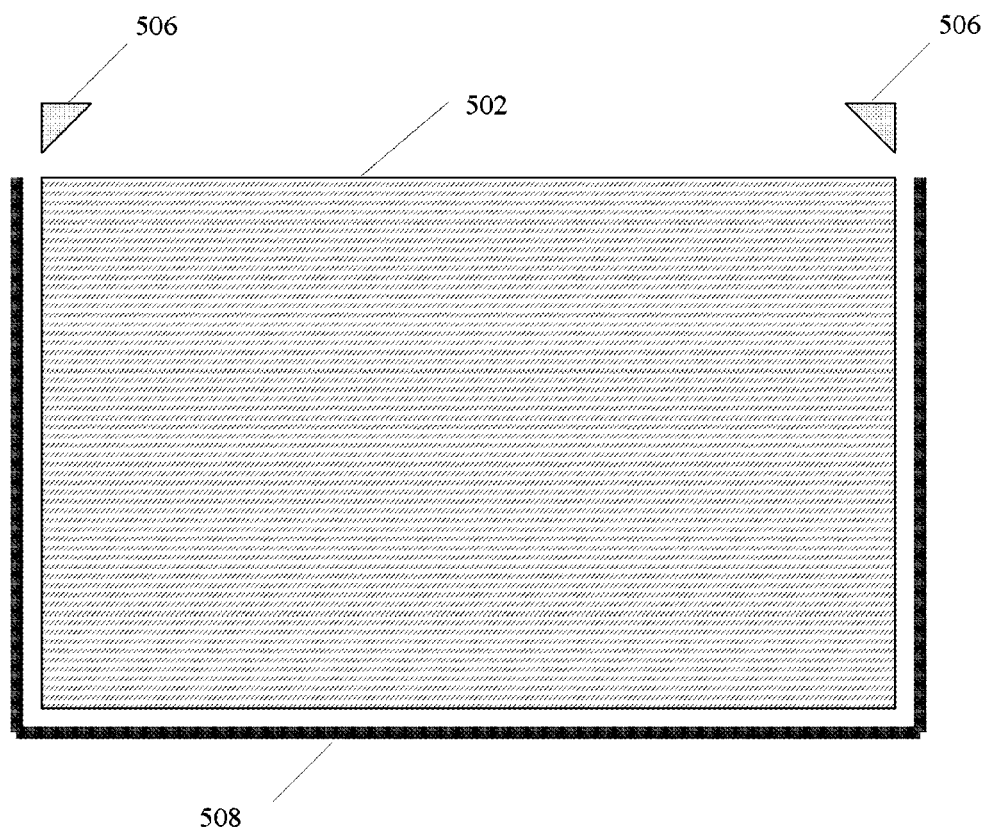
FIGS. 5a and 5b are illustrative diagrams of an optical touch system according to another embodiment of the present invention.
Figure 5B:
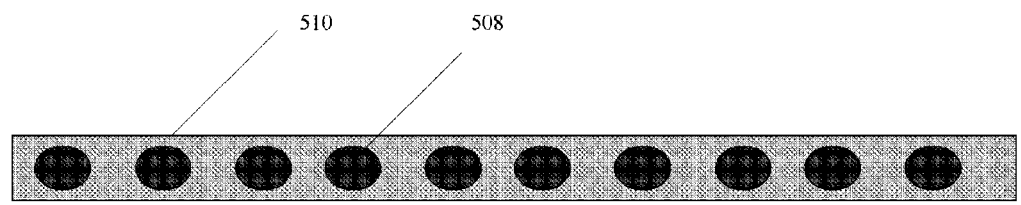

FIGS. 5a and 5b are illustrative diagrams of an optical touch system according to another embodiment of the present invention.

An illustrative diagram of the optical touch system 500 according to another embodiment of the present invention is shown in FIG. 5a. This embodiment is different from the embodiment of FIG. 1 in that the combination of the point light source 508 and the light guide plate is replaced with a linear light source 510, which consists of a plurality of LED lamps arranged in a straight line at a predetermined interval as shown in FIG. 5B. Apparently, these LED lamps may be fixed in a variety of ways, for example, may be set in a frame-shaped structure with holes or in any other appropriate ways. Since these LEDs are set with a very close interval (for example the interval should be smaller than the side face of a commonly-used touch operation body such as a finger or a stylus, and the number of the LED lamps is large, the light emitted by them is uniform. The light is similar to a light emitted by an elongated straight-line light source, and therefore it may be called as a linear light source.

As shown in FIG. 5a, the linear light source is set on the left side, right side and lower side of edges of a display screen 502, and cameras 506 are set at two vertexes on top of the display screen.

A uniform light is emitted by the linear light source and is irradiated onto the display screen and then is acquired by the camera. A part of the light emitted by the linear light source will be blocked when a finger or other object touches the display screen, so that a shadow appears in the image of the linear light source formed in the camera. A processor (not shown in the figure) connected with the camera determines the position or range of the finger or other touch operation body in the display screen by analyzing an included angle between the camera and the shadow image according to the shadow, so as to judge which operation is to be performed.

The LED lamps are low-cost, have long operating life and small size, therefore the linear light source made up of the LED lamps has a significant meaning for decreasing the system cost and reducing the system size. Of course, other light sources such as laser diodes may also be used herein in accordance with the actual requirement.

Figure 6A:
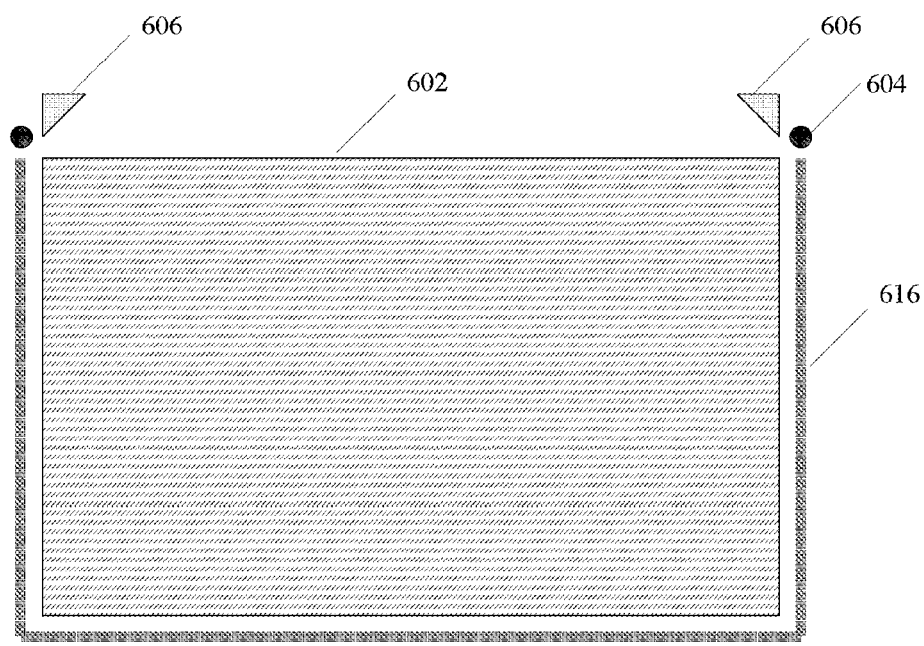
FIGS. 6a and 6b are illustrative diagrams of an optical touch system according to another embodiment of the present invention.
Figure 6B:
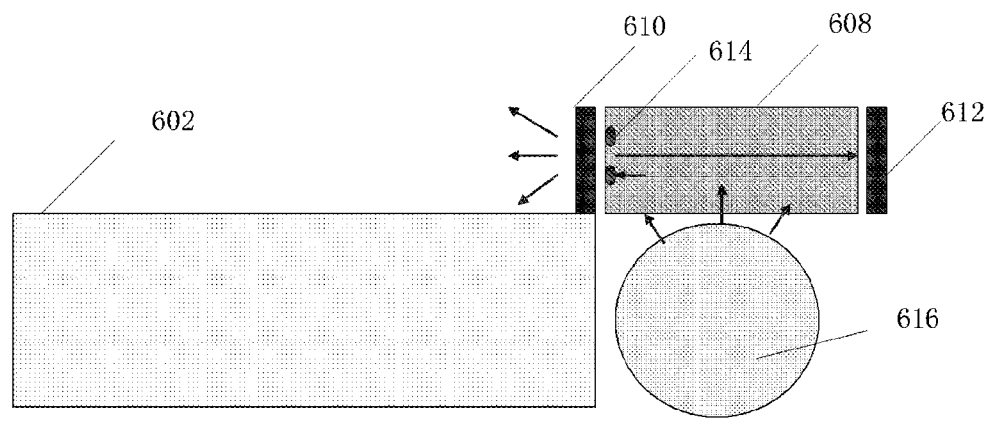

FIGS. 6a and 6b are illustrative diagrams of an optical touch system according to another embodiment of the present invention.

As shown in FIGS. 6a and 6b, the optical touch system comprises point light sources 604 and two cameras 606. The point light sources 604 are set at two vertexes on the upper side of a display screen 602. The two cameras 606 are also set at the two vertexes on the upper side of a display screen 602 and are configured to acquire a shadow image on the display screen, the shadow image is formed because touch operation body blocks the light, wherein the cameras may be various kinds of image acquisition devices, such as optical sensors, still cameras, infrared cameras, or the like. Referring to FIG. 6b, the light guide plate, whose structure is the same as that of a light guide plate set forth in the embodiment 1, includes a main body 608 of the light guide plate, and further includes a scattering film 610 and a reflective film 612. Printing ink 614 is contained on the side close to the scattering film 610 in the main body 608 of the light guide plate. The light guide plate is set on the edges of the display screen, and the lower side edge of the light guide plate is flush with or slightly below the surface of the display screen to guarantee that the scattered light covers the area on the surface of the display screen. A side-light-emitting type of optical fiber 616 is set on the lower side of the light guide plate. The direction of the optical fiber is consistent with that of the light guide plate, that is to say, they extend along the same direction, and the light-emitting direction of the optical fiber is toward the direction of the light guide plate, so that the light emitted from the optical fiber is able to be irradiated and enter the light guide plate for propagation therein. The light source (not shown in FIG. 6b) is aligned with the end face of the optical fiber in order to make the light enter and propagate along the optical fiber.

The operating principle thereof is as follows: the point light sources set at the vertexes of the display screen irradiate the end face of the optical fiber facing them; when the light enters the optical fiber, a part of the light is transmitted in it and scattered from its side face since it is the side-light-emitting type of optical fiber; since the light-emitting side face of the optical fiber is toward the light guide plate, the light is irradiated onto and enters the light guide plate; as mentioned hereinbefore, the light satisfying a total reflection condition propagates along the path of total reflection. After the light is irradiated onto the ink dots of printing ink, there will be a reflection which breaks the condition of total reflection, so that the light is emitted from the main body portion of the light guide plate and irradiated onto the reflective film. The light enters into the scattering film and is scattered to the outside thought the reflection of the reflective film. The light is scattered onto the display screen in this embodiment. The light of the linear light source will be acquired by the camera after being irradiated onto the display screen and into the camera through scattering; and the image that each linear light source forms in the camera is a bright bar. When a finger or other object is moved in the touch area, a part of the light emitted by the linear light source is blocked and cannot be directly acquired by the camera, so that a shadow appears in the image of the light guide plate formed in the camera. The processor (not shown in the figure) connected with the camera determines the position or range of the finger or other touch operation body in the display screen by analyzing an included angle between the camera and the shadow in the image according to the image, so as to judge which operation is to be performed. The specific recognition method will be described in detail hereinafter.

In this embodiment, the optical fiber is employed for supplying the light guide plate with light, thus the part of the optical unit higher than the screen can be further lowered down so as to be more suitable for apparatus with strict requirements on frame height, such as keyboards, display screens of laptops, or the like, while sustaining the luminous effect.

Specifically, in the case of the design in which only one optical component such as a light guide plate, a light guide strip or an optical fiber is used, because the light source is facing the optical component at the same height and the protective layer on top of the light source is necessary for preventing the light source being damaged, the height by which the whole optical unit is higher than the display screen is the thickness of the light source plus the thickness of a protective layer. Whereas in the case of the design in which the optical fiber is used for supplying two optical components of the light guide plate with the light, the optical fiber and the light source are set in the position as high as the display screen and the light guide plate is set on top of the optical fiber and the light source. Because the light guide plate can use a solid material such as organic glass and can thus act as the protective layer, the height by which the whole optical unit is higher than the display screen is only the thickness of the light guide plate. Therefore the frame thickness around the display screen is significantly reduced, which is suitable for products (e.g., an optical unit set on the edge of a key) with operating requirement or products (e.g., an optical unit on the edge of a laptop screen) with requirement on lightness and thinness.

In this embodiment, the light guide plate may also be replaced with other elements, for example, with a light-reflecting strip. Its principle is as follows: the point light sources set at the vertexes of the display screen irradiate the end face of the optical fiber facing them; the light enters the optical fiber; since the optical fiber is the side-light-emitting type of optical fiber and the light-emitting side face of the optical fiber is toward the direction of the light-reflecting strip, a part of the light is transmitted in the optical fiber and scattered to the outside, the light is irradiated onto the light-reflecting strip which reflects the light from the optical fiber onto the surface of the display screen and into the camera. Thereafter, when a finger or other object is moved in the touch area formed by the camera and the optical unit, a part of the light emitted by the linear optical unit will be blocked and the touch area image with the touch operation body is processed by the processor after the touch area image is acquired by the camera. The process performed by the processor is the same as that mentioned before and thus the description thereof is omitted.

Furthermore, the setting of the touch area can be arbitrarily designed according to shapes and sizes as required, as long as the setting of the image acquisition unit and optical unit satisfies the requirement. While the U-shaped area in the display equipment is exemplified in the above embodiment, the present invention is not limited to this.

Figure 7A:
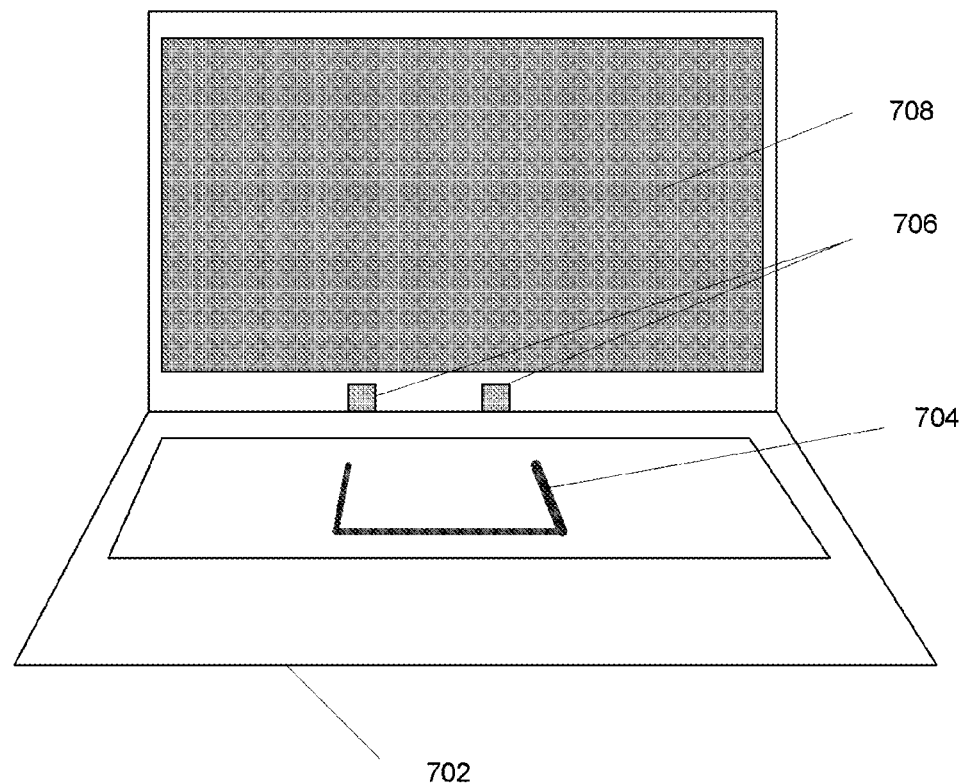
FIGS. 7a and 7b are illustrative diagrams of an optical touch system according to another embodiment of the present invention.
Figure 7B:
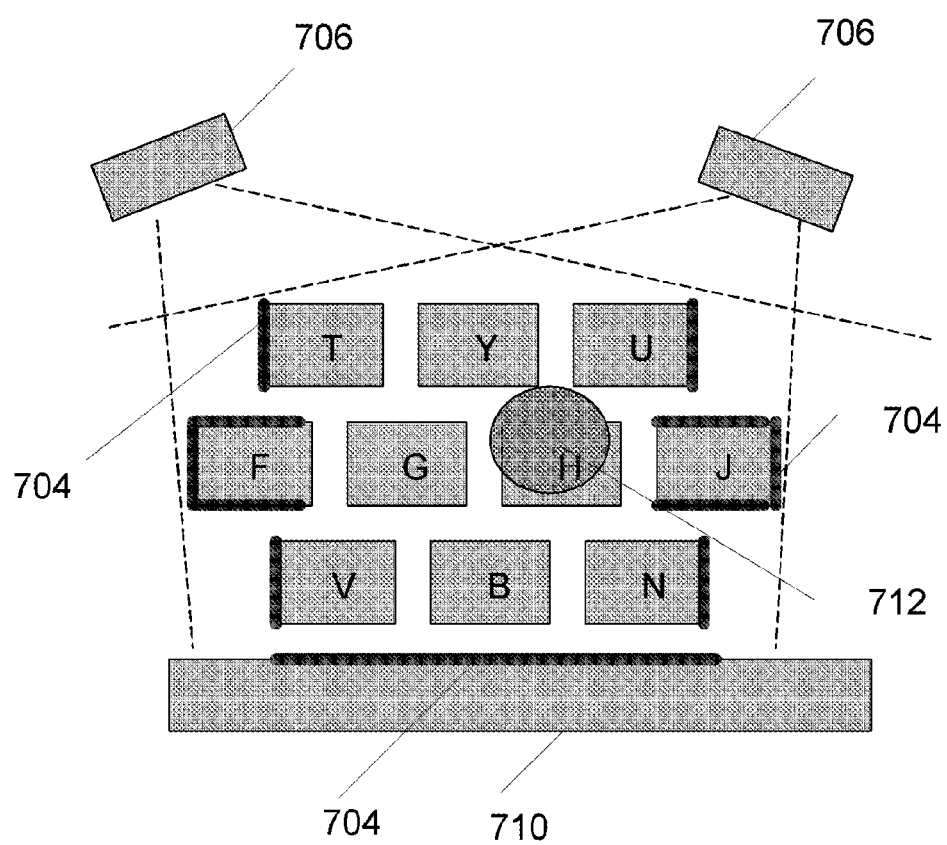

FIGS. 7a and 7b are illustrative diagrams of an optical touch system according to another embodiment of the present invention.

FIGS. 7a and 7b are illustrative diagrams of an optical touch input apparatus according to another embodiment of the present invention.

As shown in FIG. 7a, the optical touch input apparatus is set on a keyboard of a laptop and comprises a point light source (not shown in the figure), two cameras 706, and an optical unit. The two cameras 706 are set at the border between the keyboard and a screen, facing the keyboard area and configured to acquire the light emitted by the optical unit. The optical unit (herein, exemplified as a scattering optical fiber 704) is set on the keyboard and is configured to scatter the light emitted by the point light source to irradiate a predetermined area on the keyboard. A touch operation area, in which an operator performs touch operations, is formed by the cameras and the optical fiber in the figure.

FIG. 7b in which a part of the keyboard is shown is referred to for details. As shown in the figure, a shadow part depicted in a thick line on the keyboard represents the optical fiber, which is used to receive the light emitted by the light source and irradiate the surface of the keyboard (wherein the light source not shown), and the irradiation direction of the light source is to form a scheme with an approximately enclosed area and form a U-shaped light covering area with respect to the cameras. because the keyboard has gaps and is not continuous, a sufficient number of optical fibers 704 may be set in order to guarantee that sufficient light is irradiated to the keyboard area, that is, to guarantee that the touch area is large enough. Moreover, it is necessary to set the optical fibers on a plurality of keys, that is, to set multiple segments of non-continuous optical units. As shown in the figure, optical fibers are set on one side for the T, V, N, and U-keys and optical fibers are set on three sides for the F and J-keys, and additionally an optical fiber is set in the position corresponding to the V, B, and N-keys on the inner side of the space key, therefore an optical fiber design that can cover the whole touch operation area is formed.

Of course, the setting of the optical fiber in the figure is only illustrative, and actually the specific position and length of the optical fiber may be adjusted to ensure that the best effect will be achieved. Two cameras are set on top and are configured to acquire the light emitted by the optical fibers. When a touch operation body is moved in the touch area, the cameras acquire an image having the optical effect of being masked by the touch operation body, and deliver the image to a processor (not shown in the figure) which judges the position or range of the touch according to the image.

Moreover, the scheme in the present embodiment is also applicable to a keyboard of an ordinary desktop computer, as long as a plurality of keys on the keyboard are set as follows: a first optical unit is set on at least one key, a second optical unit is set on at least one key, and a third optical unit is set on at least one key, wherein the first optical unit, the second optical unit, and the third optical unit may constitute a continuous semi-enclosed area. For example, the first optical unit is arranged longitudinally, the second optical unit is arranged longitudinally, and the third optical unit is arranged horizontally; of course, a semi-enclosed area of other shapes may also be disposed in accordance with the user's requirement. A first image acquisition unit is set on the left side of the non-enclosed direction of the semi-enclosed area; a second image acquisition unit is set on the right side of the non-enclosed direction of the semi-enclosed area; so that the first optical unit, the second optical unit, the third optical unit, the first image acquisition unit, and the second image acquisition unit form a touch operation area.

Specifically, as shown in the figure, when a finger touches the top of the H-key in the figure, the finger may block the light from the undermost optical fiber and the optical fiber on the right side of N-key, so that a shadow appears in an image formed in the camera on the left side; and similarly, the finger may block the light from the undermost optical fiber and the optical fiber on the left side of the V-key, so that a shadow appears in an image formed in the camera on the right side. The two images with the shadows respectively acquired by the two cameras are delivered to the processor, which calculates the touch position of the finger according to the positions of shadows, therefore it is determined the position touched by the operator is the top position corresponding to the H-key.

FIG. 8 is an illustrative diagram of a touch recognition method according to one embodiment of the present invention.

In this embodiment, a touch system includes point light sources 806, a side-light-emitting type of optical fiber 808, cameras 802, and a processor (not shown in the figure). The point light sources 806 are set at two vertexes on top of a display screen. The side-light-emitting type of optical fiber 808, whose end faces are facing the light sources, receives the light from the light sources and its light-emitting side face is toward the middle of the display side of the display screen, and scatters the light onto the top of the display screen. The cameras 802 are set at the two vertexes on top of a display screen 804 and facing the side type of optical fiber. A touch operation area is formed by the cameras and the optical fiber, the cameras are used to acquire an image with shadow formed after a touch operation body is moved in the touch operation area. The processor is used to judge the touch position of the touch operation body in the touch area according to the shadow in the acquired image.

Figure 8A:
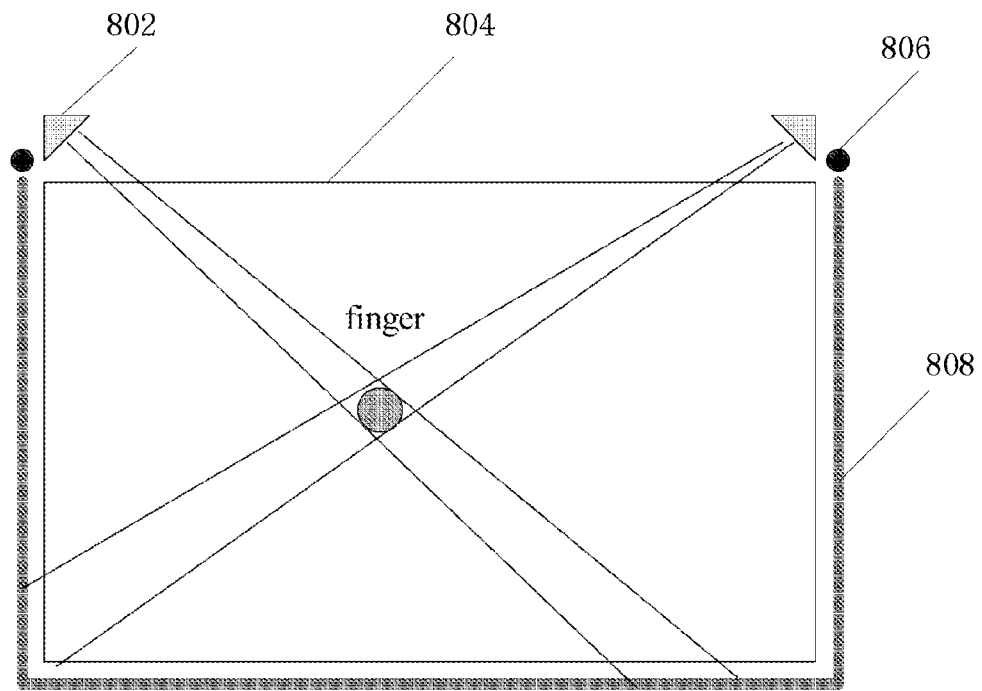
FIGS. 8a, 8b and 8c are illustrative diagrams of a touch recognition method according to one embodiment of the present invention.

When the operation body such as a finger or other object is moved in the touch area, the specific recognition procedure is as follows:

As shown in FIGS. 8a, b, and c, since both the acquisition equipment and the optical unit are located on top of the display screen, the touch area is also located on top of the display screen, and the touch area may either include the plane on which the display screen is located or be higher than the plane on which the display screen is located. The finger is moved in the touch area with a certain position on the display screen (for example, pressing or without contacting with the display screen), and the finger will block a part of light coming from the optical fiber respectively and the light cannot enter the cameras, so that the cameras will observe a shadow in a white bright bar, wherein the white bright bar is the optical fiber emitting the light and the shadow is the finger.

Figure 8B:
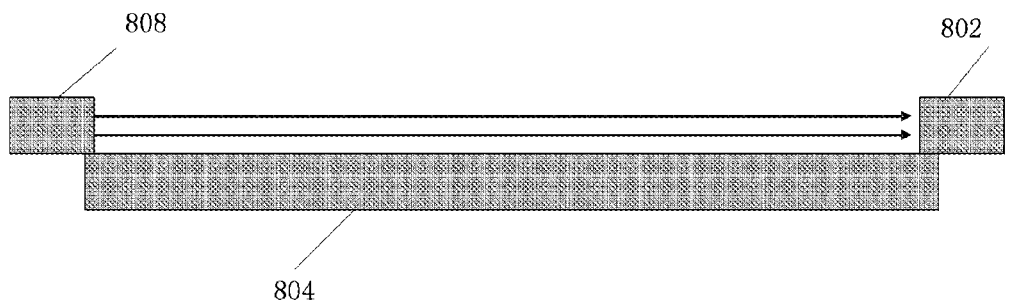

Referring to FIG. 8b, the optical fiber 808 (in fact, the side face of which is circular; however, it is illustrative herein in order to represent other cases such as a light guide plate, a light-reflecting strip, or the like) is set on the edge of the screen 804 and immediately attached onto the screen. The light emitted from the side face thereof enters into the cameras 802.

Figure 8C:
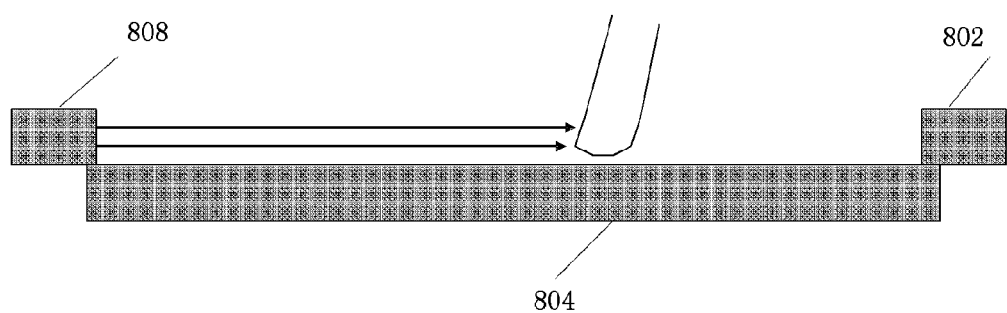

Referring to FIG. 8c, a part of the light is blocked when the finger is moved in the touch area. Therefore, the cameras detect the shadow and the image is delivered to the processor for processing.

Figure 8D:
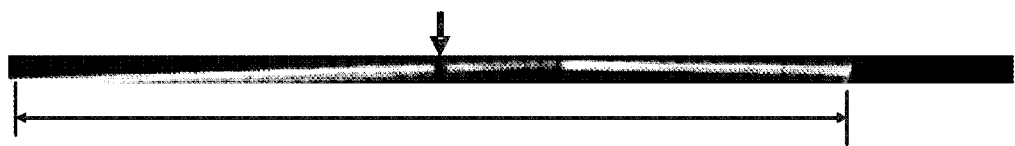
FIG. 8d shows an image shot by a camera.

FIG. 8d shows an image shot by a camera.

As shown in the figure, the white bright bar in the figure is the optical fiber emitting the light. The shadow pointed by an arrow is formed because the finger blocks the light emitted by the optical fiber. The two cameras locate the position of the finger according to that of the shadow detected.

Figure 8E:
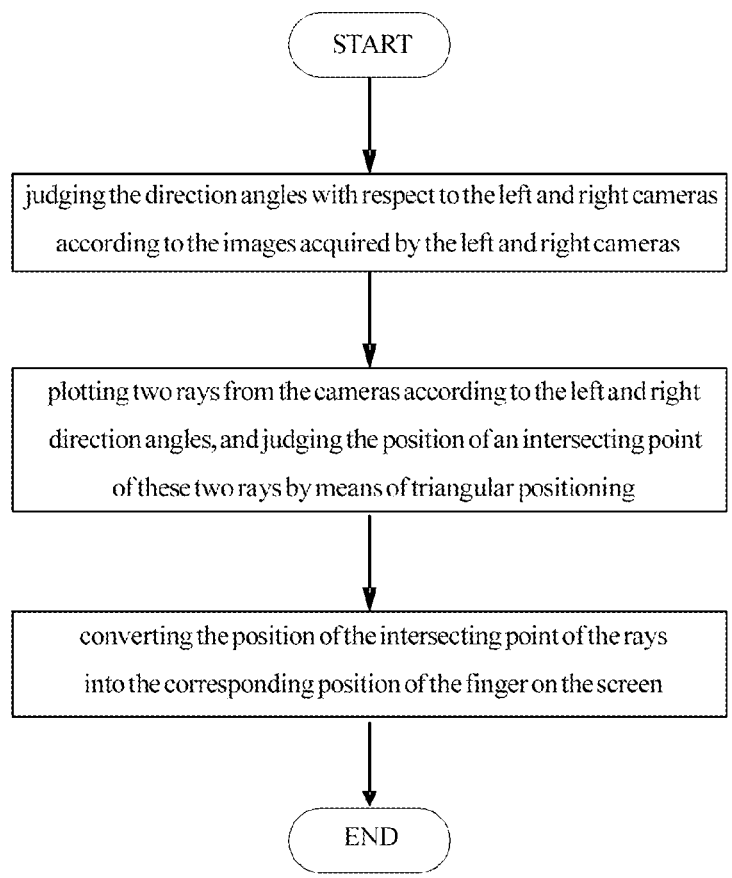
FIG. 8e shows the flow of a positioning procedure.

The flow of a positioning procedure is shown in FIG. 8e.

Firstly, the cameras on the left and right sides judge the direction angles with respect to the left and right cameras; secondly, two rays are plotted from the cameras according to the left and right direction angles, and the position of an intersecting point of these two rays is judged by means of triangular positioning. Finally, the position of the intersecting point of the rays is converted into the corresponding position of the finger on the screen.

Figure 8F:
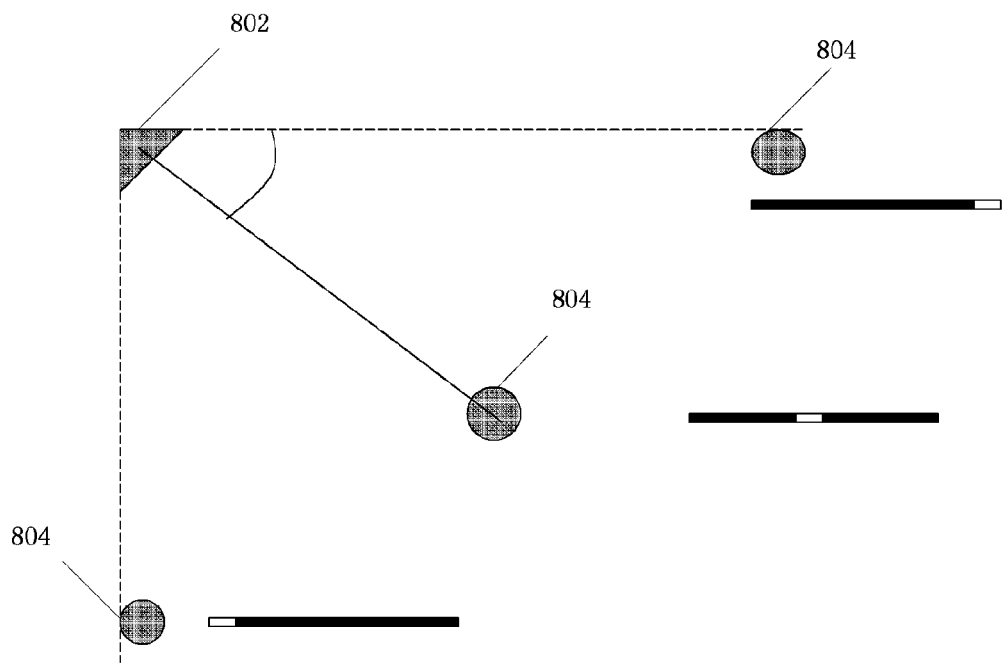
FIG. 8f shows an illustrative diagram of judging the position of a touch object in the visual field of the image.

An illustrative diagram of judging the position of a touch operation body in the visual field of the image is shown in FIG. 8f.

As shown in the figure, a camera, the acquisition range of which is 90 degrees, is located in the upper left corner, so that the optical units on the right side and lower side are within its acquisition range, that is, the whole screen area on the lower right side is within the range of its visual field. Three positions in which the finger is located are shown in the figure: when the finger is located close to the lower position on the left side of the screen, the position of the finger in the visual field observed by the camera is shown by the blank area in the long strip near the finger's position in the figure, and the blank area represents the position of the finger; when the finger is located approximately in the middle of the screen, the position of the finger in the visual field observed by the camera is shown by the blank area in the long strip near the finger's position in the middle of the figure and it is also located approximately in the middle of the long strip visual field; and when the finger is located close to the upper position on the right part of the screen, the position of the finger in the visual field observed by the camera is shown by the blank area in the long strip near the position of the finger on the upper right side on the right side of the figure. Of course, the corresponding area may vary along with the variation of the shape of the screen and the mounted angle of the camera. Therefore, the direction angle of the finger with respect to the camera can be solved by judging the specific position of the finger in the visual field of the camera.

Figure 8G:
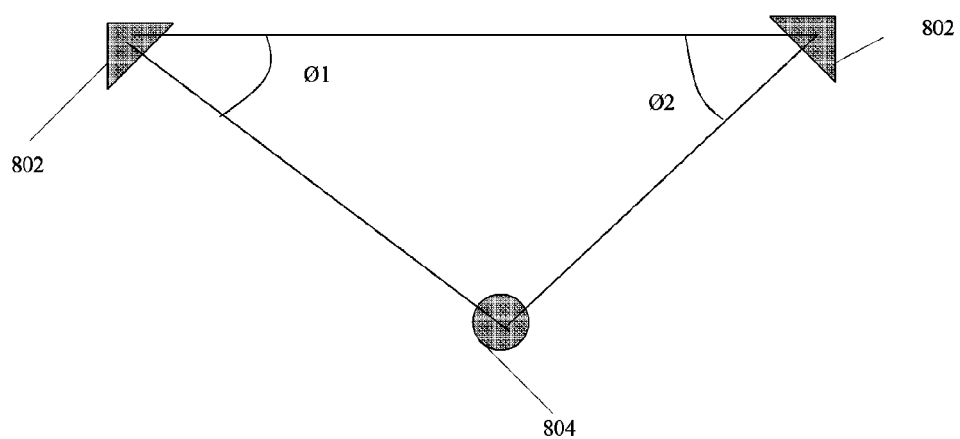
FIG. 8g shows an illustrative diagram of judging the position of the touch object according to a triangle.

Similarly, in the case of two cameras, two direction angles, $\phi 1$ and $\phi 2$, with respect to the two cameras can be obtained, and the touch position of the finger is calculated by means of a triangular positioning principle in the case that those direction angles and the distance between the two cameras are known, referring to FIG. 8g.

Additionally, it should be noted that, in the various embodiments mentioned above, it is not necessary for the touch operation body to touch the physical plane, that is to say, in the case that there is a certain gap between the touch operation body and the physical plane, the position of the touch operation body can be judged as long as a part of shadow is formed in the image acquisition unit by blocking a part of the light scattered onto the physical plane.

Furthermore, the above embodiment is described by taking two cameras as an example, and in this case, the position of the touch operation body in the touch operation area can be located. Of course, an embodiment with one camera can also be employed. In this case, the operation range of the touch operation body can be determined. For example, in the case that the camera is set on the left side of the display screen and the optical unit is set on the right side of the display screen, when the touch operation body is moved in the touch operation area along the upper and lower direction, the moving track of the touch operation body in the one-dimensional direction can be calculated, that is to say, it is able to detect the moving direction of the touch operation body, although the position of the touch operation body cannot be determined accurately using the image acquired by the camera. By using this, some predetermined functions may be achieved.

While, in the above embodiments, the optical touch system is applied to an electronic apparatus having a physical plane, in fact, it is not limited to this. It may also be applied onto a physical plane of a non-electronic apparatus, for example, a display area for controlling an electronic apparatus (such as a projecting area, which may be on a projection screen, a white board or a wall surface) or else a non-display area for controlling an electronic apparatus (such as a desktop).

Furthermore, the operation area of the optical touch system can also be applied onto a non-physical plane, for example, the optical touch system is built in an arbitrary space in accordance with the implementations in the various embodiments described above. As long as an optical unit and an image acquisition unit is fixed in the space, wherein the optical unit is set on a first fixed-point in the space and is configured to produce a first optical effect; the image acquisition unit is set on a second fixed-point in the space, at least a part of the optical unit is within an acquisition range of the image acquisition unit, and a touch operation area is formed by the image acquisition unit and the optical unit; the image acquisition unit is used to capture an image having a second optical effect which is formed on the first optical effect after an operation body for operating an electronic apparatus enters the touch operation area; a processing unit is connected with the image acquisition unit and is configured to determine the range of the operation body in the touch operation area according to the image having the second optical effect.

Specifically, when a finger or the touch operation body is operating in the touch operation area, the image acquisition unit will acquire an corresponding image formed in the touch operation area, which image is also delivered to the processor for processing, so that the position of the finger or touch operation body in the touch operation area is determined and then, which operation performed by the finger or touch operation body is judged.

Next, an optical touch system according to another embodiment of the present invention will be described. It is applied to an electronic apparatus having at least a physical plane, and it comprises: an optical unit set on the physical plane configured to produce a first optical effect; an image acquisition unit set on the physical plane, at least a part of the optical unit being within an acquisition range of the image acquisition unit, a touch operation area being formed by the image acquisition unit and the optical unit; the image acquisition unit configured to capture an image having a second optical effect which is formed on the first optical effect after an operation body for operating the electronic apparatus enters the touch operation area; and a processing unit connected with the image acquisition unit and configured to determine the range of the operation body in the touch operation area according to the image having the second optical effect.

In this embodiment, the optical unit comprises a light source and a first optical component. The first optical component is configured to have an end face facing the light source to receive light from the light source and deliver the light from the light source onto the physical plane. Wherein, a protective layer for protecting the light source is included on top of the light source. Light-reflecting particles may also be set in the first optical component. The first optical component may be a light guide plate, an optical fiber or a light-reflecting strip.

Furthermore, the optical unit may also include a light source, a first optical component, and a second optical component.

Wherein the first optical component is configured to have an end face facing the light source to receive light from the light source; and the second optical component is configured to have a side face facing a side face of the first optical component to receive the light from the first optical component and deliver the light from the first optical component onto the physical plane.

In this structure, the first optical component may be an optical fiber, the second optical component may be a light guide plate or a light-reflecting strip, and light-reflecting particles may be set in the the second optical component.

Preferably, the light source may be point light sources and set either on two ends on the opposite sides of the image acquisition unit or on two ends on the same side of the image acquisition unit. When the point light sources are set on the two ends on the opposite sides of the image acquisition unit, the number of the optical units may be three, and the optical units are facing the two light sources respectively; while when the point light sources are set on the two ends on the same side of the image acquisition unit, the number of the optical unit may be one, the optical unit is folded into an U-shape and two vertexes of the optical unit are facing the two point light sources respectively.

In other structure, the optical touch system of the embodiment may be constructed by employing various components and structures in the before-mentioned embodiments, and thus the specific description thereof is omitted.

Figure 9:
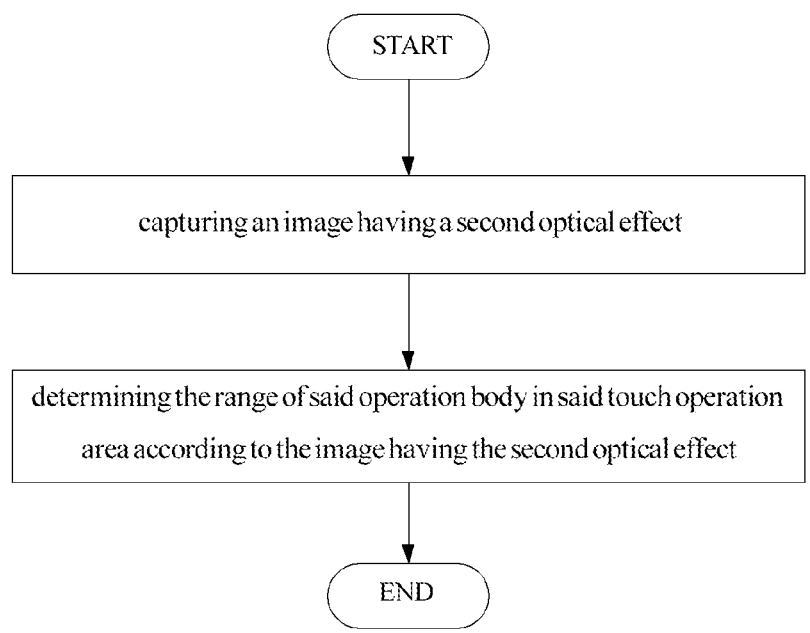
FIG. 9 is a flowchart of a touch recognition method according to one embodiment of the present invention.

FIG. 9 is a flowchart of an optical touch positioning method according to one embodiment of the present invention.

This method is used for an optical touch system which includes an optical unit configured to produce a first optical effect; and an image acquisition unit, at least a part of the optical unit is within an acquisition range of the image acquisition unit, and a touch operation area is formed by the image acquisition unit and the optical unit.

The method includes the step of: capturing an image having a second optical effect which is formed on the first optical effect after an operation body for operating the electronic apparatus enters the touch operation area; and determining the range of the operation body in the touch operation area according to the image having the second optical effect.

Wherein, the first optical effect is the effect that the optical unit emits the light, from the view of the acquisition unit; and the second optical effect is the effect which is formed in the optical acquisition unit after the operation body blocks the light when it enters the touch operation area, from the view of the acquisition unit.

Wherein, the touch range of the operation body in the touch area is obtained by analyzing an included angle between the image acquisition unit and the image according to the image. In case of two image acquisition units, included angles between the touch position and the two acquisition units can be obtained respectively, so as to form a triangle, and then, a relatively accurate position of the touch position in the touch area can be obtained by means of a triangular positioning technique according to a preset distance between the image acquisition units.

The following technical effects are achieved by the technical solutions of the present invention: the influence of ambient illumination can be avoided by employing the optical touch system according to the embodiment of the present invention. It is still possible that the frame may still be illuminated when there is a great deal of infrared light. The recognition of the touch position is impacted because the design of the light-absorbing frame in the prior art will cause substantive interference. The frame will not be impacted by the ambient infrared light by employing the design of one optical component according to the embodiment of the present invention, so that while reducing the ambient interference, the accuracy of the touch operation can be improved, the structure is simple and the cost is low.

Furthermore, in case of using the design of one optical component, the height by which the whole optical unit is higher than the display screen is the thickness of the light source plus the thickness of a protective layer, because the light source is facing the optical component and the protective layer on top of the light source is necessary. Whereas in the case of the design in which two optical components, a first optical component and a second optical component, are used, the height by which the whole optical unit is higher than the display screen is only the thickness of the second optical component, because the first optical component and the light source are set in the position as high as the display screen and the second optical component which can use a solid material such as organic glass or the like and which can thus act as the protective layer is set on top of the first optical component and the light source. Therefore the frame thickness around the display screen is significantly reduced, which is suitable for products (e.g., a keyboard) with operating requirement or products (e.g., a laptop screen) with requirement on lightness and thinness.

The foregoing is only embodiments of the present invention, and should not be used to limit the present invention. It should be understood by those skilled in the art that various alterations and changes may occur in the present invention. It should be understood by those skilled in the art that any modifications, equivalent replacements, enhancements, and the like should be contained within the scope of the appended claims of the present invention as long as they are within the spirits and principles thereof.

What is claimed is:

1. An optical touch system, applied to an electronic apparatus having at least a physical plane, characterized in that it comprises:
    an optical unit set on the physical plane and configured to produce a first optical effect;
    an image acquisition unit set on the physical plane, at least a part of the optical unit being within an acquisition range of the image acquisition unit, a touch operation area being formed by the image acquisition unit and the optical unit; the image acquisition unit configured to capture an image having a second optical effect which is formed on the first optical effect after an operation body for operating the electronic apparatus enters the touch operation area; and
    a processing unit connected with the image acquisition unit and configured to determine the range of the operation body in the touch operation area according to the image having the second optical effect,
    wherein the image acquisition unit is set at one vertex or two vertexes located on a first edge on the physical plane respectively, the optical unit is set on an edge other than the first edge on the physical plane and, the optical unit comprises:

a light source;

an optical component configured to propagate the light from the light source along a side of the physical plane while scattering the light from the point light source onto the physical plane wherein the optical component comprises a first optical element configured to have an end face facing the light source to receive light from the light source; and a second optical element configured to have a side face facing a side face of the first optical element to receive the light from the first optical element and deliver the light from the first optical element onto the physical plane, the first optical element is an optical fiber, and the second optical element is a light guide plate, the light guide plate is set on the optical fiber along the edge of the physical plane, the light guide plate being used to scatter the light from the optical fiber onto the physical plane, the optical fiber is located under the light guide plate;

the light guide plate is set on the edges of a display screen, and the lower side edge of the light guide plate is flush with the surface of the display screen.

2. The optical touch system of claim 1, wherein a protective layer for protecting the light source is included on top of the light source.

3. The optical touch system of claim 1, wherein light-reflecting particles are set in the first optical element.

4. The optical touch system of claim 1, wherein the light guide plate comprises:

a reflective film located on one side of a main body portion of the light guide plate and configured to reflect the light propagated within the light guide plate;

a scattering film located on the other side of the main body portion of the light guide plate and configured to scatter the light reflected by the reflective film onto the physical plane.

5. The optical touch system of claim 4, characterized in that the light guide plate further comprises:

a partially anti-reflection film located between the scattering film and the main body portion of the light guide plate and configured to increase the amount of the light propagated within the light guide plate and passing through the scattering film.

6. The optical touch system of claim 1, wherein the light guide plate contains:

a main body portion of the light guide plate doped with reflective particles for reflecting light therein;

a reflective film located on one side of the main body portion of the light guide plate and configured to reflect the light from the main body portion of the light guide plate; and a scattering film located on the other side of the main body portion of the light guide plate and configured to scatter the light reflected by the reflective film onto the physical plane.

7. The optical touch system of claim 1 wherein the optical fiber comprises:

a core portion doped with reflective particles for reflecting light therein; and a peripheral portion surrounding the core portion, and the refractive index of the peripheral portion is less than the refractive index of the core portion.

8. The optical touch system of claim 1, wherein the light source is at least one of a light-emitting diode or a laser diode.

9. The optical touch system of claim 1, wherein the light source is set at one vertex or two vertexes located on a second edge facing the first edge on the physical plane respectively.

10. The optical touch system of claim 9, wherein the first optical element and the second optical element are set on edges other than the first edge on the physical plane respectively.

11. An optical touch input display apparatus, comprising:

a display unit used to display information;

a first optical unit, a second optical unit, and a third optical unit set on the left frame, the right frame, and the lower frame on the display side of the display unit respectively and configured to produce a first optical effect;

a first image acquisition unit set on the upper left part of the display side of the display unit;

a second image acquisition unit set on the upper right part of the display side of the display unit;

wherein, a touch operation area being formed by the first optical unit, the second optical unit, the third optical unit, the first image acquisition unit, and the second image acquisition unit;

the first image acquisition unit configured to acquire a first image which is an image formed on the first optical effect produced by the second optical unit and/or the third optical unit after an operation body enters the touch operation area;

the second image acquisition unit configured to acquire a second image which is an image formed on the first optical effect produced by the first optical unit and/or the third optical unit after the operation body enters the touch operation area;

a processing unit connected with the first image acquisition unit and the second image acquisition unit and configured to determine the range of the operation body in the touch operation area according to the first image and the second image, and the first optical unit and the second optical unit each comprise a light source and an a first optical component configured to propagate the light from the light source along a side of the display unit while scattering the light from the point light source onto the display unit, wherein the first optical component comprises:

a first optical element configured to have an end face facing the light source to receive light from the light source and a second optical element configured to have a side face facing a side face of the first optical element to receive the light from the light source and deliver the light from the first optical element to the touch operation area, the light source is a point light source set on the edge of the display unit the first optical element is an optical fiber is set along the edge of the display unit, the optical fiber having an end face facing the point light source and configured to receive light from the point light source and scatter the light from the point light source through a side face of the optical fiber, and the second optical element is a light guide plate set on the optical fiber along the edge of the display unit, the light guide plate configured to scatter the light from the optical fiber onto the display unit, wherein the third optical unit comprises an optical fiber and a light guide plate, wherein the optical fiber of each of the first optical unit, the second optical unit, and the third optical unit is located under each respective light guide plate; and each respective light guide plate is set on the edges of a display screen, and the lower side edge of each respective light guide plate is flush with the surface of the display screen.

12. The optical touch input display apparatus of claim 11 wherein light-reflecting particles are set in the first optical element.

13. The optical touch input display apparatus of claim 11, characterized in that the first image acquisition unit and the second image acquisition unit are set at the upper left vertex and the upper right vertex on the upper edge on the display unit respectively.

14. The optical touch input display apparatus of claim 13, wherein the light sources of the first optical unit and the second optical unit include light sources set at the lower left vertex and the lower right vertex on the lower edge on the display unit respectively, wherein the first optical unit and third optical unit receive light from the point light source located at the lower left vertex and the second optical unit and third optical unit receive light from the point light source located at the lower right vertex.

15. The optical touch input display apparatus of claim 13, wherein the light sources of the first optical unit and the second optical unit include light sources set at the upper left vertex and the upper right vertex on the upper edge on the display unit respectively, wherein the first optical unit and third optical unit receive light from the point light source located at the upper left vertex, and the second optical unit and third optical unit receive light from the point light source located at the upper right vertex.

16. The optical touch input display apparatus of claim 11, wherein the light guide plate comprises:
    a main body portion of the light guide plate doped with reflective particles for reflecting light therein;
    a reflective film located on one side of the main body portion of the light guide plate and configured to reflect the light from the main body portion of the light guide plate; and
    a scattering film located on the other side of the main body portion of the light guide plate and configured to scatter the light from the main body portion of the light guide plate onto the display unit.

17. An optical touch input apparatus, comprising:
    a keyboard;
    a first optical unit, a second optical unit, and a third optical unit set on the left side, the right side, and the lower side of the keyboard respectively and configured to produce a first optical effect;
    a first image acquisition unit set on the upper left part of the keyboard;
    a second image acquisition unit set on the upper right part of the keyboard;
    wherein, a touch operation area is formed by the first optical unit, the second optical unit, the third optical unit, the first image acquisition unit, and the second image acquisition unit;
    the first image acquisition unit is configured to acquire a first image which is an image formed on the first optical effect produced by the second optical unit and/or the third optical unit after an operation body entering the touch operation area;
    the second image acquisition unit is configured to acquire a second image which is an image formed on the first optical effect produced by the first optical unit and/or the third optical unit after the operation body enters the touch operation area;
    a processing unit connected with the first image acquisition unit and the second image acquisition unit and configured to determine the range of the operation body in the touch operation area according to the first image and the second image, and
    the first optical unit and the second optical unit each comprise a light source and an a first optical component configured to propagate the light from the light source along a side of the keyboard while scattering the light from the light source onto the keyboard,
    wherein the first optical component comprises a first optical element and a second optical element:
    the first optical element is configured to have an end face facing the light source to receive light from the light source; and
    the second optical element is configured to have a side face facing a side face of the first optical element to receive the light from the first optical element and deliver the light from the first optical element to the touch operation area,
    wherein the third optical unit comprises an optical fiber and a light guide plate,
    wherein the optical fiber of each of the first optical unit, the second optical unit, and the third optical unit is located under each respective light guide plate; and
    each respective light guide plate is set on the edges of a display screen, and the lower side edge of each respective light guide plate is flush with the surface of the display screen.

18. An optical touch positioning method for an optical touch system which includes an optical unit used to produce a first optical effect; and an image acquisition unit, at least a part of the optical unit being within an acquisition range of the image acquisition unit, a touch operation area being formed by the image acquisition unit and the optical unit;
    wherein the method comprises the step of:
    capturing an image having a second optical effect which is formed on the first optical effect after an operation body for operating the electronic apparatus enters the touch operation area; and
    determining the range of the operation body in the touch operation area according to the image having the second optical effect,
    wherein the image acquisition unit is set at one vertex or two vertexes located on a first edge on the physical plane respectively and the optical unit is set on an edge other than the first edge on the physical plane, and wherein
    the optical unit comprises a light source and an optical component configured to propagate the light from the light source along a side of a physical plane while scattering light from the point light source onto the physical plane,
    wherein the optical component comprises
        a first optical element configured to have an end face facing the light source to receive light from the light source; and
        a second optical element configured to have a side face facing a side face of the first optical element to receive the light from the first optical element and deliver the light from the first optical element onto the physical plane, the first optical element is an optical fiber, and the second optical element is a light guide plate, the light guide plate is set on the optical fiber along the edge of the physical plane, the light guide plate being used to scatter the light from the optical fiber onto the physical plane, the optical fiber is located under the light guide plate;

the light guide plate is set on the edges of a display screen, and the lower side edge of the light guide plate is flush with the surface of the display screen.

19. The optical touch positioning method of claim 18, characterized in that: the first optical effect is the effect that the optical unit emits the light, from the view of the acquisition unit; and the second optical effect is the effect which is formed in the optical acquisition unit after the operation body blocks the light after it enters the touch operation area, from the view of the acquisition unit.

20. The optical touch positioning method of claim 19, characterized in that: the touch range of the operation body in the touch area is obtained by analyzing an included angle between the image acquisition unit and the image according to the image.

21. The optical touch positioning method of claim 20, characterized in that:

two included angles between the touch position and two acquisition units respectively are obtained with the two image acquisition units, so as to form a triangle, and then, the accurate position of the touch position in the touch area is obtained by means of a triangular positioning technique according to a preset distance between the image acquisition units.

22. The optical touch system of claim 1, wherein light-reflecting particles are set in the second optical element.

* * * * *